United States Patent Office 2,996,399
Patented Aug. 15, 1961

2,996,399
BITUMINOUS COMPOSITIONS
Clarence F. Huber, Mount Healthy, and Paul F. Thompson, Deer Park, Ohio, assignors to The Cincinnati Milling Machine Company, Cincinnati, Ohio, a corporation of Ohio
No Drawing. Original application Mar. 15, 1955, Ser. No. 494,569, now Patent No. 2,874,174, dated Feb. 17, 1959. Divided and this application Apr. 18, 1958, Ser. No. 736,427
13 Claims. (Cl. 106—269)

This invention relates to bituminous compositions of the type that are mixed with mineral aggregates in the construction of asphalt pavements. More particularly the invention relates to a novel group of bonding agents which are adapted to be incorporated in such bituminous compositions and when so incorporated not only improve the bonding effectiveness of the bituminous composition but also exhibit improved thermal stability as compared with the bonding agents previously used.

It is known in the art of manufacturing bituminous compositions that the coating and bonding qualities of such compositions when mixed with mineral aggregates in the construction of asphalt pavements can be improved by addition thereto of certain chemical agents. The use of these agents has made is possible to use wet aggregates in preparing paving mixtures, thus making it unnecessary to have dry aggregates available and eliminating delays in road construction. Also the incorporation of such bonding agents in bituminous paving compositions has made it possible to use hydrophilic aggregates which could not be otherwise used. Moreover the use of these chemical bonding agents has brought about an improvement in the structural stability of the finished bituminous pavement by decreasing the tendency of the aggregate and bitumen to separate when exposed to water. Thus these agents have been useful in improving the method of asphalt road construction and improving the quality and length of service of the finished pavement.

However, in general these previously proposed bonding agents have been subject to the deficiency that they do not remain stable at elevated temperatures. In many instances it is common practice to store bituminous compositions, after they have been prepared, in tanks at an elevated temperature of say 250–400° F. and maintain them in a fluid state so that the composition can be readily removed without the re-heating that would be necessary if the composition were allowed to cool and solidify. The period of storage may be as long as 14 days. In other cases quantities of asphalt or light bitumen are heated as high as 400°–500° F. at the time of shipment so that the temperature upon arrival at the point of destination will have dropped to about 300°–350° F., which is the desirable temperature required for proper application in preparing the paving mixture.

In general the previously proposed bonding agents are incapable of withstanding such elevated temperatures; when subjected to such temperatures they rapidly lose their effectiveness and become of little value as bonding agents. Accordingly it is an object of the present invention to provide a novel group of compounds which are adapted to be incorporated in bituminous paving compositions to improve the coating properties of the composition for wet aggregates and which retain their bonding effectiveness when subjected to the elevated temperatures encountered during the storage and handling of asphalt compositions.

In accordance with the present invention the foregoing objective is achieved by incorporating in bituminous compositions one or more compounds selected from the class of amides of N,N,N-tri(aminoalkyl)amines and their salts. It has been found that when small amounts of such compounds are incorporated in a bituminous composition, the coating and bonding properties of the composition for wet aggregates is substantially improved and this improvement is retained even when the bituminous composition is maintained at elevated temperatures for extended periods of time.

The amides and amide salts of the present invention include the nine classes indicated below:

(1) Mono-amides having the general formula:

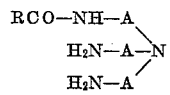

wherein RCO is an acyl group derived from an organic acid having from 10–20 carbon atoms, and A is an aliphatic hydrocarbon group having from 2–6 carbon atoms. In this formula the three A groups may have different numbers of carbon atoms.

(2) Di-amides having the general formula:

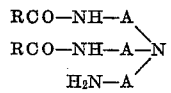

wherein RCO is an acyl group derived from an organic acid having from 2–20 carbon atoms and A has the same definition as in Formula 1. In this formula the two RCO groups may be different and at least one RCO group should be derived from acid containing 10–20 carbon atoms.

(3) Tri-amides having the general formula:

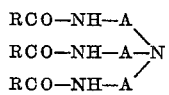

wherein RCO is an acyl group derived from an organic acid having from 2–20 carbon atoms; A is defined as in Formula 1; the three RCO groups may be different; and at least one RCO group is derived from an acid having 10–20 carbon atoms.

(4) A mono-amide-mono-salt having the general formula:

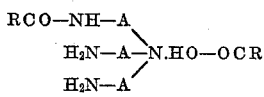

wherein RCO is an acyl group derived from an acid having 10–20 carbon atoms; A is defined as in Formula 1; and the two RCO groups may be different.

(5) A di-amide-mono-salt having the general formula:

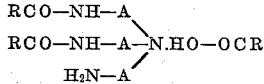

wherein RCO is an acyl group derived from an organic acid having 2–20 carbon atoms; A is defined as in Formula 1; the RCO group of the salt-forming acid and at least one of the other RCO groups is derived from an acid having 10–20 carbon atoms; and the several RCO groups may be derived from different acids.

(6) A tri-amide-mono-salt having the general formula:

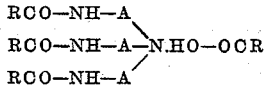

wherein RCO and A have the same definitions as in Formula 5.

(7) A mono-amide-disalt having the general formula:

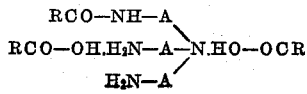

wherein RCO is an acyl group derived from an acid having 2-20 carbon atoms; A has the same definitions as in Formula 1; the RCO group of the amide-forming acid and at least one of the other RCO groups is derived from an acid containing from 10-20 carbon atoms; and the several RCO groups may be different.

(8) A mono-amide-tri-salt having the general formula:

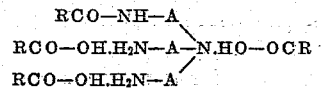

wherein RCO and A have the same definitions as in Formula 7.

(9) A di-amide-di-salt having the general formula:

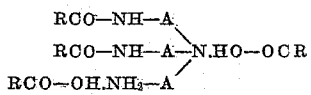

wherein RCO and A have the same definitions as in Formula 7; at least one of the amide-forming RCO groups is derived from an acid containing from 10-20 carbon atoms; and the several RCO groups may be different.

Typical compounds that come within the scope of the foregoing general formulae and are useful in accordance with the present invention are:

$(C_{17}H_{33}CONHCH_2CH_2CH_2)_3N$ named N,N,N-tris(3-oleoylaminopropyl)amine;

named N - (3 - oleoylaminopropyl) - N - (3 - palmitoylaminopropyl)-N-(3-linoleoylaminopropyl)amine;

$(CH_{15}H_{31}CONHCH_2CH_2CH_2)_2N$
$—CH_2CH_2CH_2NHCOCH_3$ named N - (3 - acetamidopropyl) - N,N - bis(3 - palmitoylaminopropyl)amine;

$C_{17}H_{31}CONHCH_2CH_2CH_2$
$—N(CH_2CH_2CH_2NHCOCH_2CH_2CH_3)_2$ named N,N - bis(3 - butyrylaminopropyl) - N - (3-linoleoylaminopropyl)amine;

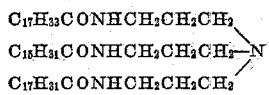

named N - (6 - linoleoylaminohexyl) - N - (3 - oleoylaminopropyl)-N-(2-palmitoylaminoisopropylamine. This is one of the several compounds formed by acylation with three different fatty acids.

$(C_{15}H_{31}CONHCH_2CH_2CH_2)_2N—CH_2CH_2CH_2NH_2$ named N - (3 - aminopropyl) - N,N - bis(3 - palmitoylaminopropyl)amine;

$C_{17}H_{33}CONHCH_2CH_2CH_2—N(CH_2CH_2CH_2NH_2)_2$ named N,N - bis(3 - aminopropyl) - N - (3 - oleoylaminopropyl)amine;

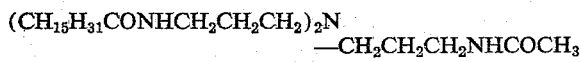

named stearic acid salt of N-(2-linoleoylaminoethyl)-N-(3 - oleoylaminopropyl) - N - (2 - palmitoylaminoisopropyl)amine. This is one of several compounds formed by acylation with three different fatty acids.

$C_{15}H_{31}CONHCH_2CH_2CH_2$
$—N(CH_2CH_2CH_2NH_2)_2 \cdot C_{17}H_{33}COOH$ named oleic acid salt of N,N-bis(3-aminopropyl)-N-(3-palmitoylaminopropyl)amine;

$C_{17}H_{33}CONHCH_2CH_2CH_2—N(CH_2CH_2CH_2NH_2)_2$
$\cdot C_{17}H_{31}COOH \cdot C_{15}H_{31}COOH \cdot C_{17}H_{35}COOH$ named mixed linoleic, palmitic, and stearic acid salt of N,N - bis(3-aminopropyl) - N - (3-oleoylaminopropyl)amine;

$(C_{17}H_{33}CONHCH_2CH_2CH_2)_2N$
$—CH_2CH_2CH_2NH_2 \cdot 2C_{15}H_{31}COOH$ named palmitic acid salt of N,N-bis(3-oleoylaminopropyl)-N-(3-aminopropyl)amine.

In preparing the amides and amide salts of the present invention, organic acids are reacted with tris(aminoalkyl)amines. Representative amines of this class that may be used are: $(H_2N—CH_2CH_2)_3N$, named N,N,N-tris(2 - aminoethyl)amine; $(H_2N—CH_2CH(CH_3))_3N$, named N,N,N-tris(2-aminoisopropyl)amine; $(H_2N—CH_2CH_2CH_2CH_2CH_2)_3N$, named N,N,N-tris(6-aminohexyl)amine; $H_2N—CH_2CH_2CH_2—N(CH_2CH_2—NH_2)—CH_2CH_2CH_2CH_2CH_2CH_2—NH_2$, named N-(3-aminopropyl)-N-(2-aminoethyl)-N-(6-aminohexyl)amine.

As pointed out above, the acyl group of the salt-forming acid and at least one of the amide-forming acyl groups should be derived from an organic acid having 10-20 carbon atoms and representative acids of this group that may be used are: oleic, linoleic, linolenic, lauric, palmitic, stearic, rosin acid, abietic acids, naphthenic acids, tall oil acids, or any acids derived from tall oils as well as mixtures of the foregoing acids. In cases where the present compounds contain more than one amide-forming acyl group, including at least one acyl group derived from an acid having 10-20 carbon atoms, the other acyl groups of the compound may be derived from acids containing fewer than 10 carbon atoms. Representative acids of this group are: acetic, butyric, 2-ethylhexanoic, hexoic, caprylic, caproic, toluic, benzoic and 2-ethyl-butyric acids.

In preparing the amido-amines of the present invention a tri(aminoalkyl)amine is mixed with a suitable organic acid, acyl halide, or ester and heated at 100–200° C. with agitation. The reaction with an organic acid may be considered as taking place in two stages; upon mixing, the amine salt of the organic acid is formed and during the heating process the salt is dehydrated with the elimination of 1 mol of water for each amide group. The methods of making compounds of the type represented by Formulae 1–9 are indicated below.

To make the compounds of Formula 1 equimolar quantities of acid and amine are mixed to form an amine salt which is heated to convert the amine salt to an amide according to the following equations:

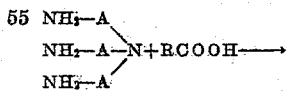

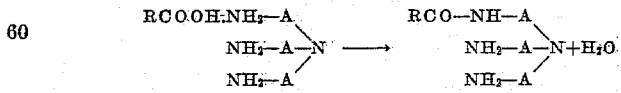

The compounds of Formulae 2 and 3 may be prepared in the same way as those of Formula 1 except that two and three mols of acid respectively are used per mol of amine.

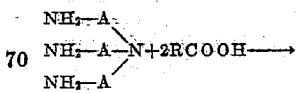

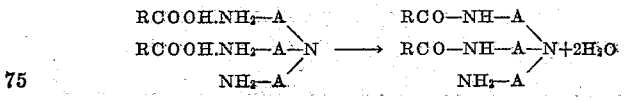

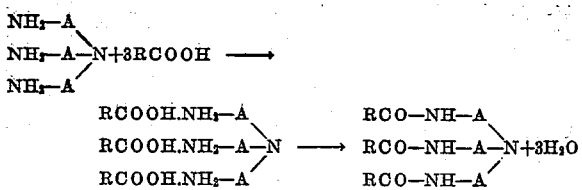

In preparing the compounds of Formula 4 equimolar quantities of acid and amine are mixed and heated to form an amide, and then a second mol of acid is mixed with the amide to form the salt.

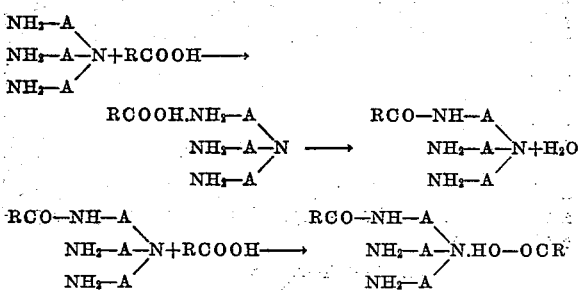

The compounds of Formula 5 can be made by making a diamide as in Formula 2 and then mixing a mol of acid therewith to form the salt.

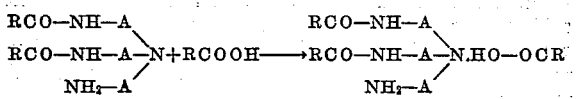

The compounds of Formula 6 can be made by making a triamide as in Formula 3 and then mixing a mol of acid therewith to form the salt, or they can also be made by the direct reaction of four mols of acid with one mol of the amine.

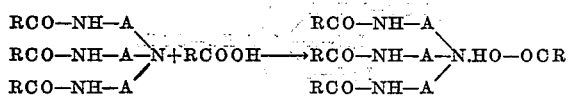

The compounds of Formulae 7 and 8 can be made by preparing a monoamide as in Formula 1 and the mixing two or three mols of acid respectively therewith to form the salt.

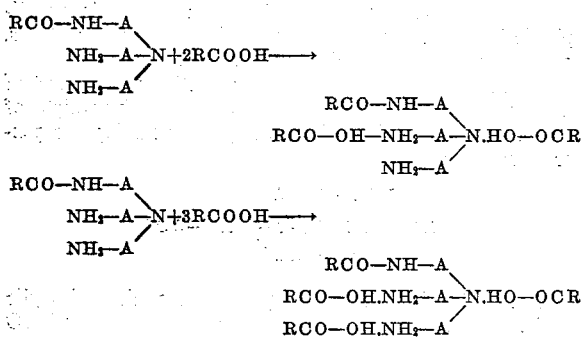

The compounds of Formula 9 can be made by preparing a diamide as in Formula 2 and then mixing two mols of acid therewith to form a salt.

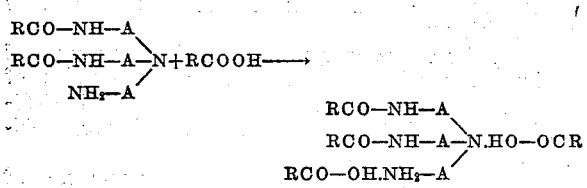

It will be evident that in the case of compounds such as those of Formulae 2 and 3, the compounds can be prepared by the addition of one mol of acid at a time with subsequent heating to form an amide group. Also where the several acyl groups of the compounds are derived from different acids, stepwise amidation is preferable to use, but simultaneous amidation can be carried out by using a mixture of the required acids.

In order to point out more fully the nature of the present invention the following specific examples are given of illustrative methods of making certain of the present compounds:

Example I

A mixture of three mols of linoleic acid and one mol of N - (2 - aminoethyl) - N - (2 - aminoisopropyl) - N - (6-aminohexyl) amine was heated for six hours with agitation at 150° C. Approximately three mols of water was distilled off during this times. The material was cooled and mixed with one mol of oleic acid, giving the oleic acid salt of N-(2-linoleoylaminoethyl)-N-(2-linoleoylaminoisopropyl) - N - (6 - linoleoylaminohexyl) amine. The product was thermally stable in asphalt and was an effective agent for bonding asphalt to wet aggregate.

Example II

A mixture of one mol of palmitic acid and ten mols of N,N,N - tris(2 - aminoethyl)amine was heated and agitated at 150° C. for six hours. The mixture was then distilled at atmospheric pressure until half of its volume had been removed. The remaining volatile matter was removed by vacuum distillation, leaving as a residue mainly N,N - bis(2 - aminoethyl)-N-(2-palmitoylaminoethyl)-amine. The product was thermally stable in asphalt and was an effective agent for bonding asphalt to wet aggregate.

Example III

One mol of material prepared as in Example II was mixed with two mols of tall oil. The resulting material, which was a di-tall oil acid salt of N,N-bis(2-aminoethyl)-N-(2-palmitoylaminoethyl)amine, was thermally stable in asphalt and was an effective agent for bonding asphalt to wet aggregate.

Example IV

A mixture of one mol of N-(2-aminoethyl)-N-(2-aminoisopropyl)-N-(6-aminohexyl)amine, one mol of oleic acid, one mol of linoleic acid, and one mol of palmitic acid was stirred and heated for six hours at 150° C. The product which was a mixture of triamides of these three acids, was thermally stable in asphalt and was an effective agent for bonding asphalt to wet aggregate.

It has been found that when suitable quantities of the foregoing compounds, usually 0.1 to 5% by weight, are incorporated in asphalt they confer on the asphalt the ability to effectively coat wet aggregates and the improved coating and bonding properties of the asphalt are retained even when it is maintained at elevated temperatures for extended periods of time. In fact it has been found that the effectiveness of the present compounds is sometimes enhanced by heating in asphalt, possibly due to the fact that compounds such as those represented by Formulae 1 to 5 and 7 are capable of reacting with further quantities of acid and may react with the naphthenic acids present in the asphalt.

It is of course to be understood that the foregoing examples are illustrative only and that numerous amidoamines and salts other than those specifically referred to fall within the scope of the general formulae given above and can be incorporated in asphalt to achieve the advantages outlined at the beginning of the present specification.

This application is a division of our parent application, Serial No. 494,569, filed March 15, 1955, now Patent No. 2,874,174.

We claim:

1. A bituminous composition essentially composed of a bituminous material and from 0.1 to 5% by weight of a thermally stable bond-improving agent selected from the group consisting of amides of tris(aminoalkyl)amines and salts of such amides, the amide-forming acids being organic carboxylic acids having from 2 to 20 carbon atoms; and the salt-forming acids, when present, and at least one of the amide-forming acids being organic carboxylic acids having from 10 to 20 carbon atoms.

2. A bituminous composition essentially composed of a bituminous material and from 0.1 to 5% by weight of a thermally stable bond-improving agent having the general formula:

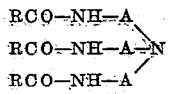

wherein RCO is an acyl group of an organic carboxylic acid having 2-20 carbon atoms, at least one of said RCO groups is derived from an acid having 10-20 carbon atoms, and the several RCO groups can be different; and A is an aliphatic hydrocarbon radical containing 2-6 carbon atoms, and the several A radicals can be different.

3. A bituminous composition essentially composed of a bituminous material and from 0.1 to 5% by weight of a thermally stable bond-improving agent having the general formula:

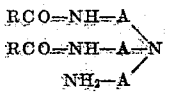

wherein RCO is an acyl group of an organic carboxylic acid having 2-20 carbon atoms, at least one of said RCO groups contains 10-20 carbon atoms, and the two RCO groups can be different; and A is an aliphatic hydrocarbon radical containing 2-6 carbon atoms, and the several A radicals can be different.

4. A bituminous composition essentially composed of a bituminous material and from 0.1 to 5% by weight of a thermally stable bond-improving agent having the general formula:

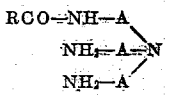

wherein RCO is an acyl group of an organic carboxylic acid having 10-20 carbon atoms; and A is an aliphatic hydrocarbon radical containing 2-6 carbon atoms, and the several A radicals can be different.

5. A bituminous composition essentially composed of a bituminous material and from 0.1 to 5% by weight of a thermally stable bond-improving agent having the general formula:

RCO—NH—A
RCO—NH—A—N.HO—OCR
RCO—NH—A wherein RCO is an acyl group of an organic carboxylic acid having 2-20 carbon atoms, the RCO group of the salt-forming acid and at least one other RCO group having 10-20 carbon atoms, and the several RCO groups can be different; and A is an aliphatic hydrocarbon radical containing 2-6 carbon atoms, and the several A radicals can be different.

6. A bituminous composition essentially composed of a bituminous material and from 0.1 to 5% by weight of a thermally stable bond-improving agent having the general formula:

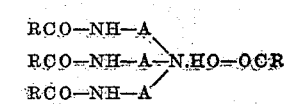

wherein RCO is an acyl group of an organic carboxylic acid having 2-20 carbon atoms, the RCO group of the salt-forming acid and at least one other RCO group having from 10-20 carbon atoms, and the several RCO groups can be different; and A is an aliphatic hydrocarbon radical containing 2-6 carbon atoms, and the several A radicals can be different.

7. A bituminous composition essentially composed of a bituminous material and from 0.1 to 5% by weight of a thermally stable bond-improving agent having the general formula:

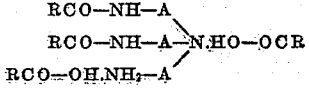

wherein RCO is an acyl group of an organic carboxylic acid having 2-20 carbon atoms, the RCO group of at least one of the salt-forming acids and at least one of the amide-forming RCO groups having from 10-20 carbon atoms, and the several RCO groups can be different; and A is an aliphatic hydrocarbon radical containing 2-6 carbon atoms, and the several A radicals can be different.

8. A bituminous composition essentially composed of a bituminous material and from 0.1 to 5% by weight of a thermally stable bond-improving agent having the general formula:

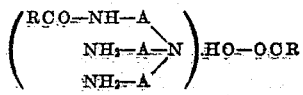

wherein RCO is an acyl group of an organic carboxylic acid having 10-20 carbon atoms, and the two RCO groups can be different; and A is an aliphatic hydrocarbon radical containing 2-6 carbon atoms, and the several A radicals can be different.

9. A bituminous composition essentially composed of a bituminous material and from 0.1 to 5% by weight of a thermally stable bond-improving agent having the general formula:

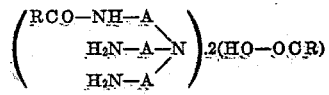

wherein RCO is an acyl group of an organic carboxylic acid having 2-20 carbon atoms, the RCO group of at least one of the salt-forming acids and the amide-forming RCO group having from 10-20 carbon atoms, and the several RCO groups can be different; and A is an aliphatic hydrocarbon radical containing 2-6 carbon atoms, and the several A radicals can be different.

10. A bituminous composition essentially composed of a bituminous material and from 0.1 to 5% by weight of a thermally stable bond-improving agent having the general formula:

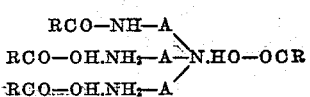

wherein RCO is an acyl group of an organic carboxylic acid having 2-20 carbon atoms, the amide-forming RCO group and at least one other RCO group having from 10-20 carbon atoms, and the several RCO groups can be different; and A is an aliphatic hydrocarbon radical containing 2-6 carbon atoms, and the several A radicals can be different.

11. A bituminous composition essentially composed of a bituminous material and from 0.1 to 5% by weight of a thermally stable bond-improving agent which is N-(2-linoleoylaminoethyl)-N-(2 - linoleoylaminoisopropyl)-N-(6-linoleoylaminohexyl) amine.

12. A bituminous composition essentially composed of a bituminous material and from 0.1 to 5% by weight of a thermally stable bond-improving agent which is N,N-bis(2-aminoethyl)-N-(2-palmitoyl-aminoethyl) amine.

13. A bituminous composition essentially composed of a bituminous material and from 0.1 to 5% by weight of a thermally stable bond-improving agent which is a di-tall oil acid salt of N,N-bis(2-aminoethyl)-N-(2-palmitoylaminoethyl) amine.

References Cited in the file of this patent

UNITED STATES PATENTS

| | | |
|---|---|---|
| 2,508,924 | Mertens | May 23, 1950 |
| 2,514,954 | Johnson et al. | July 11, 1950 |
| 2,844,599 | Rendall et al. | July 22, 1958 |

FOREIGN PATENTS

| | | |
|---|---|---|
| 130,484 | Australia | Nov. 28, 1946 |
| 971,023 | France | Jan. 11, 1951 |